(12) United States Patent
Fuwa et al.

(10) Patent No.: US 7,806,105 B2
(45) Date of Patent: Oct. 5, 2010

(54) IDLE SPEED CONTROL APPARATUS FOR INTERNAL COMBUSTION ENGINE

(75) Inventors: Naohide Fuwa, Aichi-ken (JP); Hisayo Yoshikawa, Nagoya (JP)

(73) Assignees: Toyota Jidosha Kabushiki Kaisha (JP); Denso Corporation (JP)

( * ) Notice: Subject to any disclaimer, the term of this patent is extended or adjusted under 35 U.S.C. 154(b) by 557 days.

(21) Appl. No.: 11/910,882

(22) PCT Filed: Apr. 5, 2006

(86) PCT No.: PCT/JP2006/307697

§ 371 (c)(1),
(2), (4) Date: Oct. 5, 2007

(87) PCT Pub. No.: WO2006/107118

PCT Pub. Date: Oct. 12, 2006

(65) Prior Publication Data

US 2009/0050107 A1    Feb. 26, 2009

(30) Foreign Application Priority Data

Apr. 5, 2005    (JP)    ............................. 2005-108925

(51) Int. Cl.
*F02D 41/00*    (2006.01)
*F02D 13/02*    (2006.01)

(52) U.S. Cl. .................................. 123/346; 123/339.1

(58) Field of Classification Search .................. 123/346, 123/347, 399, 339.1, 339.14, 339.19, 90.15
See application file for complete search history.

(56) References Cited

U.S. PATENT DOCUMENTS

| | | | |
|---|---|---|---|
| 5,293,741 A | 3/1994 | Kashiyama et al. | |
| 5,529,031 A | 6/1996 | Yoshioka | |
| 6,250,283 B1 | 6/2001 | Russell et al. | |
| 6,651,619 B2 * | 11/2003 | Ogiso | 123/339.11 |
| 7,610,898 B2 * | 11/2009 | Hiraku et al. | 123/339.14 |
| 2002/0152989 A1 | 10/2002 | Price | |
| 2003/0140893 A1 | 7/2003 | Ogiso | |
| 2005/0178357 A1 | 8/2005 | Yui et al. | |
| 2008/0115762 A1 | 5/2008 | Hiraku et al. | |

FOREIGN PATENT DOCUMENTS

| | | |
|---|---|---|
| CN | 101031709 A | 9/2007 |
| JP | 2001-263015 A | 9/2001 |

* cited by examiner

*Primary Examiner*—Hieu T Vo
(74) *Attorney, Agent, or Firm*—Sughrue Mion, PLLC

(57) ABSTRACT

When it is determined that an engine speed NE rapidly decreases (positive outcome at S210), a throttle increase amount TAu and a valve lift increase amount VLu are computed based on a decrease rate NEd of the engine speed NE (S220). Then, a target throttle opening degree TAt of a throttle valve and a target maximum valve lift VLt of an intake valve are increased by using the throttle increase amount TAu and the valve lift increase amount VLu (S230). As a result, a drop in the engine speed during idling is reliably suppressed.

12 Claims, 6 Drawing Sheets

IDLE SPEED CONTROL APPARATUS FOR INTERNAL COMBUSTION ENGINE

FIELD OF THE INVENTION

The present invention relates to an idle speed control apparatus for an internal combustion engine that controls an engine speed during idling to be the same as a target engine speed.

BACKGROUND OF THE INVENTION

Typically, a target engine speed is set during idling of an internal combustion engine. To equalize the actual engine speed to the target engine speed, an idle speed control (hereinafter, referred to as ISC) is performed. In the ISC, the opening degree of an intake air amount control valve such as a throttle valve and an idle speed control valve is controlled, thereby adjusting the amount of intake air drawn into a combustion chamber.

During idling of an internal combustion engine, when the load of accessories (for example, an air conditioner compressor and a power steering pump) driven by the power of the engine and the electricity consumption of the vehicle increase, such increase in the load and electricity consumption can suddenly reduce the engine speed. Thus, to compensate for the reduction in the engine speed, the intake air amount needs to be quickly increased. The opening degree of an intake air amount control valve is increased through the ISC.

Since an intake air amount control valve is spaced from a combustion chamber by a certain distance, there is a time lag from when the opening degree of the valve is increased to when the amount of intake air drawn into the combustion chamber is actually increased. During such a delay, the engine speed continues decreasing. In this manner, in the ISC performed by controlling the opening degree of the intake air amount control valve, when the engine speed rapidly decreases due to an increase in the load of accessories and the electricity consumption, the control of the idle speed temporarily lags behind desired timing.

On the other hand, to increase the engine power or to improve the emission, a type of an internal combustion engine has been proposed that includes a variable valve actuation adjustment mechanism (for example, see Japanese Laid-Open Patent Publication No. 2001-263015). Such a mechanism changes valve actuation parameters such as the opening period and the lift of an intake valve.

In an internal combustion engine having such a valve actuation parameter adjustment mechanism, the amount of intake air drawn into a combustion chamber is quickly changed by varying valve actuation parameters. Thus, when the engine speed rapidly drops, the valve actuation parameters are varied in addition to adjustment of increase in the opening degree of the intake air amount control valve, so that the intake air amount is quickly increased.

SUMMARY OF THE INVENTION

In an internal combustion engine having such a valve actuation parameter adjustment mechanism, a control of the idle speed by varying valve actuation parameters causes the following drawbacks.

That is, during idling, the intake air amount that is increased immediately after the valve actuation parameters are changed is mostly the amount of air that exists between an intake valve and the intake air amount control valve located upstream of the intake valve in the path of the intake air. When the air in this section rapidly flows toward the combustion chamber, the intake pressure in a section downstream of the intake air amount control valve rapidly decreases. This reduces the pressure difference between a section in the intake passage downstream of the intake air amount control valve and the combustion chamber during the intake stroke. Thereafter, the intake air amount, which has been increased by the change of the valve actuation parameters, is reduced. Therefore, if the valve actuation parameters are changed when the engine speed drops, the drop in the engine speed is not sufficiently suppressed.

Accordingly, it is an objective of the present invention to provide an idle speed control apparatus for an internal combustion engine that suppresses a drop in an engine speed during idling.

To achieve the foregoing objective, one aspect of the present invention provides an apparatus for controlling a speed of an internal combustion engine during idling to be a target engine speed. The engine includes a valve actuation parameter adjustment mechanism capable of changing an intake valve actuation parameter that is at least one of a valve opening period and a valve lift of an intake valve, and an intake air amount control valve located in a section upstream of the intake valve. The apparatus includes a changing section that, when the engine speed during idling rapidly decreases, changes the intake valve actuation parameter and a control valve opening degree, which is an opening degree of the intake air amount control valve, such that an intake air amount is increased.

DETAILED DESCRIPTION OF THE PREFERRED EMBODIMENTS

An idle speed control apparatus for an internal combustion engine according to a first embodiment of the present invention will now be described with reference to FIGS. 1 to 6.

Figure 1:
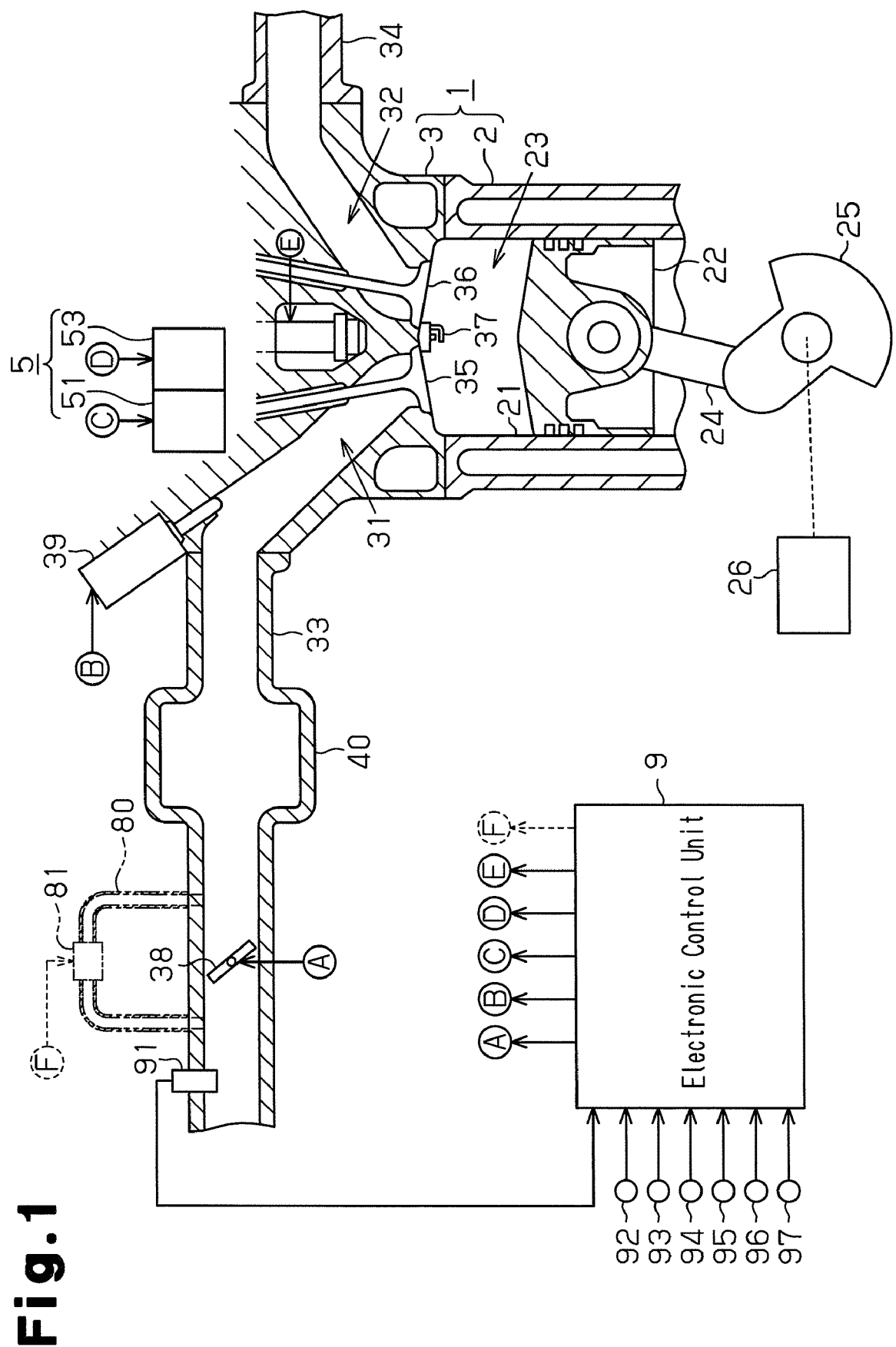
FIG. 1 is a diagram illustrating an internal combustion engine to which an idle speed control apparatus according to a first embodiment of the present invention is applied.

FIG. 1 illustrates the configuration of an engine 1 according to this embodiment.

As shown in FIG. 1, the engine 1 has a cylinder block 2 and a cylinder head 3. The cylinder block 2 has a cylinder 21. A piston 22 is housed in the cylinder 21 to reciprocate inside the cylinder 21. Reciprocation of the piston 22 is transmitted to a crankshaft 25 by a connecting rod 24. The power of the engine 1 is thus output from the crankshaft 25.

A combustion chamber 23 is defined in the cylinder 21 by the inner circumferential surface of the cylinder 21, the top of the piston 22, and the cylinder head 3.

An intake port 31 and an exhaust port 32 are formed in the cylinder head 3. An intake pipe 33 is connected to the intake port 31, and an exhaust pipe 34 is connected to the exhaust port 32. The intake port 31 and the combustion chamber 23 are connected to and disconnected from each other by opening and closing the intake valve 35, while the exhaust port 32 and the combustion chamber 23 are connected to and disconnected from each other by opening and closing the exhaust valve 36. An injector 39 is provided in the intake port 31 to inject fuel into the intake port 31.

The ignition plug 37 is provided in a section of the cylinder head 3 that forms the top of the combustion chamber 23. The ignition plug 37 sparks to ignite air-fuel mixture.

A surge tank 40 is located in the intake pipe 33. A throttle valve 38 is located in a section of the intake pipe 33 that is upstream of the surge tank 40 with respect to the flow of intake air. The throttle valve 38 adjusts the flow rate of air flowing through the intake pipe 33. The throttle valve 38 serves as an intake air amount control valve. The intake port 31, the intake pipe 33, and the surge tank 40 form an intake passage through which intake air flows.

A variable valve actuation mechanism 5 is provided in the cylinder head 3 to change valve actuation parameters of the intake valve 35. The variable valve actuation mechanism 5 includes a variable valve timing mechanism 51 that changes the valve timing of the intake valve 35, and a variable valve duration mechanism 53 that changes the valve duration INCAM of the intake valve 35. The valve duration INCAM of the intake valve 35 corresponds to a period during which the intake valve 35 is open. The variable valve duration mechanism 53 serves as a valve actuation parameter adjustment mechanism.

Figure 2:
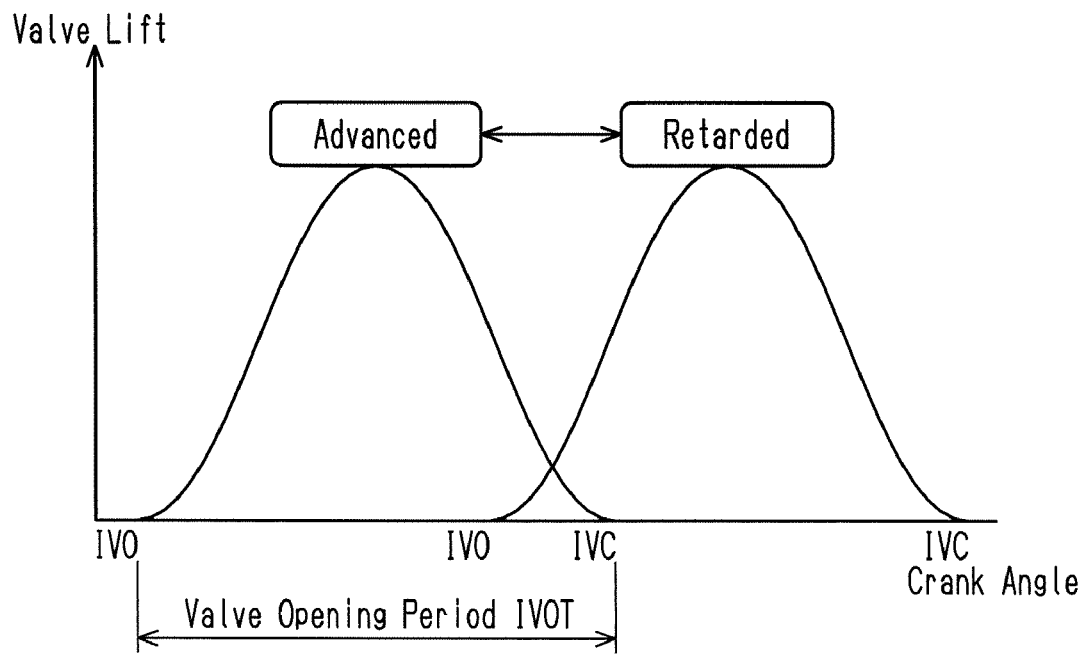
FIG. 2 is a graph showing the valve timing of an intake valve changed by a variable valve timing mechanism according to the first embodiment.

The variable valve timing mechanism 51 changes a relative rotational phase between a camshaft driving the intake valve 35 and the crankshaft 25 of the engine 1. That is, the variable valve timing mechanism 51 continuously changes the valve timing INVT of the intake valve 35. As the valve timing INVT is changed, the point at which the intake valve 35 opens (IVO) and the point at which the intake valve 35 closes (IVC) are both advanced or retarded by the same degrees of the crank angle. That is, in the state where the period during which the intake valve 35 is open (IVOT) is constant as shown in FIG. 2, the intake valve opening point IVO and the intake valve closing point IVC are advanced or retarded. Actuation of the variable valve timing mechanism 51 is controlled by an electronic control unit 9 discussed below, such that the valve timing INVT becomes equal to a target valve timing INVTt determined in accordance with the operating state of the engine 1.

Figure 3:
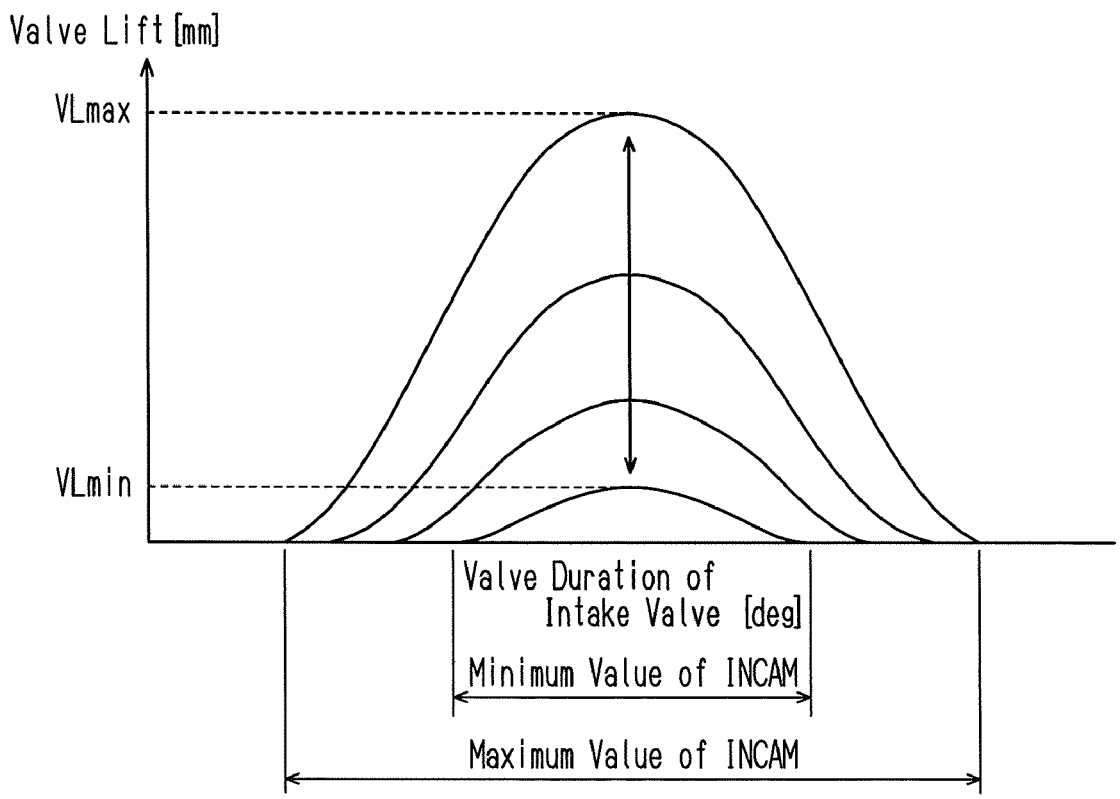
FIG. 3 is a graph showing the maximum valve lift and the valve duration of the intake valve changed by a variable valve duration mechanism according to the first embodiment.

The variable valve duration mechanism 53 continuously changes the valve duration INCAM of the intake valve 35, or the opening period IVOT and the maximum value of the valve lift (hereinafter, referred to as the maximum valve lift VL). As shown in FIG. 3, the maximum valve lift VL of the intake valve 35 is continuously changed between an upper limit valve lift VLmax, which is an upper limit of the maximum valve lift VL, and a lower limit valve lift VLmin, which is a lower limit of the maximum valve lift VL. In synchronization with the continuous change in the maximum valve lift VL, the valve duration INCAM of the intake valve 35 is continuously changed. That is, as the maximum valve lift VL is reduced, the valve duration INCAM is shortened accordingly. The valve duration INCAM is maximum at the upper limit lift VLmax, and the valve duration INCAM is minimum at the lower limit lift VLmin. Actuation of the variable valve duration mechanism 53 is controlled by the electronic control unit 9 discussed below, such that the maximum valve lift VL becomes equal to a target maximum valve lift VLt determined in accordance with the operating state of the engine 1. Since the variable valve duration mechanism 53 synchronously changes the maximum valve lift VL and the valve duration INCAM, the variable valve duration mechanism 53 may be controlled such that the valve duration INCAM becomes a target valve duration determined in accordance with the operating state of the engine 1.

Also, when the variable valve duration mechanism 53 is activated, the intake valve opening point IVO and the intake valve closing point IVC of the intake valve 35 are changed. The variable valve timing mechanism 51 is capable of arbitrarily setting the intake valve opening point IVO and the intake valve closing point IVC independent of the operation of the variable valve duration mechanism 53.

The crankshaft 25 is coupled to accessories 26 driven by the power of the engine 1. These accessories 26 include, for example, an air-conditioning compressor, a power steering pump, a hydraulic pump, and an alternator.

The engine 1 includes various sensors for detecting the operating state.

The various types of sensor include, for example, an intake air amount sensor 91 that detects the flow rate (intake air amount) passing through the intake pipe 33, a coolant temperature sensor 92 that detects the temperature of coolant of the engine 1 (coolant temperature THW), and a crank angle sensor 93 that detects a rotation angle of the crank shaft (crank angle) and the engine speed NE. Further, the sensors include a throttle opening sensor 94 that detects the opening degree of the throttle valve 38 (throttle opening degree TA), a valve timing sensor 95 that detects the valve timing INVT of the intake valve 35, a valve lift sensor 96 that detects the maximum lift VL of the intake valve 35, and an accelerator pedal sensor 97 that detects a manipulation amount of an accelerator pedal.

The engine 1 includes the electronic control unit 9, which is composed of, for example, a microcomputer. The electronic control unit 9 receives detection signals from various sensors and performs various computations. Based on the computation results, the electronic control unit 9 executes various controls regarding the engine control, such as a throttle valve opening degree control, a fuel injection control, a control of the variable valve timing mechanism 51 and the variable valve duration mechanism 53.

Among such various controls, the electronic control unit 9 executes the ISC.

The ISC is a control in which the engine speed NE is controlled to become a predetermined target engine speed NEt during idling of the engine 1, and is executed by controlling the opening degree of the throttle valve 38.

Hereinafter, the procedure of the ISC will be described with reference to the flowchart of FIG. 4.

The series of processes shown in the flowchart is executed by the electronic control unit 9 at predetermined intervals.

Figure 4:
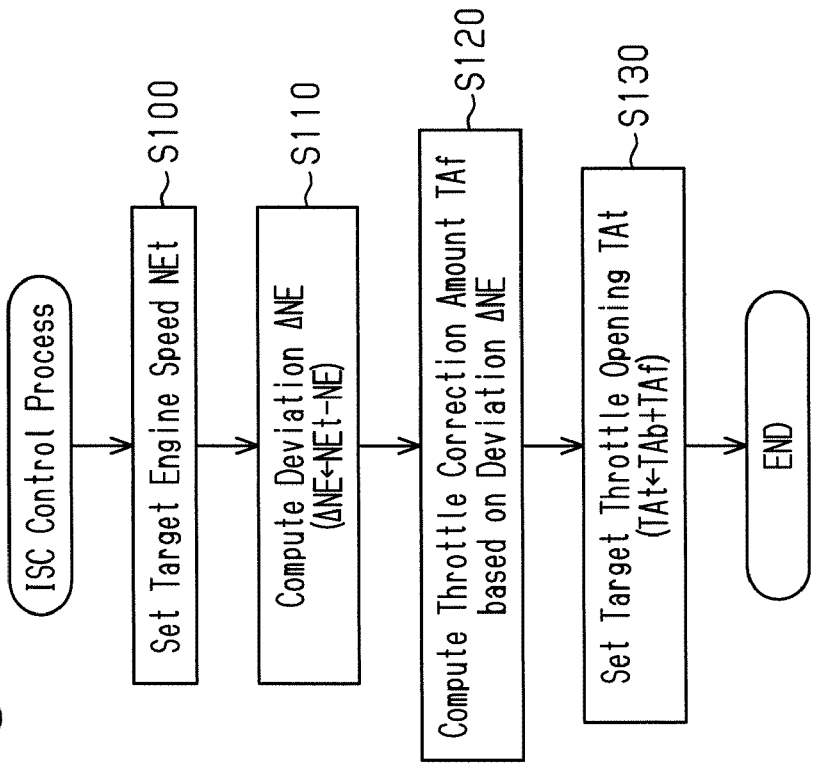
FIG. 4 is a flowchart showing a procedure for an ISC according to the first embodiment.

As shown in FIG. 4, a target engine speed NEt during idling is set (S100). Specifically, the target engine speed NEt of the engine speed NE is computed based on the coolant temperature THW. The lower the coolant temperature THW, the more unstable the engine combustion state becomes. To avoid this, the target engine speed NEt is increased as the coolant temperature THW is lowered.

Then, the deviation ΔNE of the engine speed NE from the target engine speed NEt (ΔNE=NEt−NE) is computed (S110). Based on the deviation ΔNE, a throttle correction amount TAf is computed (S120). The throttle correction amount TAf is computed in the following manner.

When the engine speed NE is lower than the target engine speed NEt (deviation ΔNE>0), the throttle correction amount TAf is set to a positive value. When the engine speed NE is higher than the target engine speed NEt (deviation ΔNE<0), the throttle correction amount TAf is set to a negative value. The greater the absolute value of the deviation ΔNE (=|NEt−NE|), the greater the absolute value of the throttle correction amount TAf is set. When the engine speed NE is equal to the target engine sped NEt, the throttle correction amount TAf is set to zero. In this manner, the throttle correction amount TAf is computed in accordance with the deviation of the engine speed NE with respect to the target engine speed NEt.

Then, the target throttle opening degree TAt is set based on the following equation (1).

Target Throttle Opening Degree TAt=Basic Throttle Opening Degree TAb+Throttle correction amount TAf  (1)

The basic throttle opening degree TAb is determined based on the target engine speed NEt. The higher the target engine speed NEt, the greater the basic throttle opening degree TAb is set.

When the basic throttle opening degree TAb is corrected based on the deviation ΔNE to obtain the target throttle opening degree TAt, the opening degree of the throttle valve 38 is controlled to be the same as the target throttle opening degree TAt. The current process is temporarily suspended.

By executing the ISC process, throttle opening degree TA is adjusted according to the deviation ΔNE. The amount of intake air drawn into the combustion chamber 23 is thus adjusted. Through the change of the fuel injection amount accompanying the adjustment of the intake air amount, the engine speed NE during idling is subject to feedback control and is maintained to the target engine speed NEt.

During idling of the engine 1, if the load of the accessories 26 and the electricity consumption of the vehicle are increased, the engine speed NE suddenly drops in some cases. To compensate for such a drop in the engine speed NE, the intake air amount needs to be quickly increased.

Since the throttle valve 38 is spaced from the combustion chamber 23 by a certain distance, there is a time lag from when the opening degree of the throttle valve 38 is increased to when the amount of intake air drawn into the combustion chamber 23 is actually increased. During such a delay, the engine speed NE continues dropping. In this manner, in the ISC performed by controlling the opening degree of the throttle valve 38, when the engine speed NE rapidly drops due to an increase in the load of the accessories and the electricity consumption, the control of the idle speed temporarily lags behind a desired timing.

On the other hand, the engine 1 has the variable valve duration mechanism 53 that changes valve actuation parameters such as the opening period and the maximum lift of the intake valve 35. The variable valve duration mechanism 53 changes valve actuation parameters to increase the intake air amount. That is, the variable valve duration mechanism 53 increases the maximum valve lift VL and the valve duration INCAM, thereby quickly changing the amount of intake air drawn into the combustion chamber 23. Thus, when the engine speed NE rapidly drops as described above, the intake air amount can be quickly increased by changing the valve actuation parameters. However, when the idle speed is controlled through such changes of the valve actuation parameters, the following disadvantages can be caused.

That is, during idling, the intake air amount that is increased immediately after the valve actuation parameters are changed is mostly the amount of air that exists between the intake valve 35 and the throttle valve 38 located upstream of the intake valve 35 in the path of the intake air. When the air in this section rapidly flows toward the combustion chamber 23, the intake pressure in a section downstream of the throttle valve 38 rapidly decreases. This reduces the pressure difference between a section in the intake passage downstream of the throttle valve 38 and the combustion chamber 23 during the intake stroke, and the intake air amount, which has been increased by the change of the valve actuation parameters, is thereafter reduced. Therefore, if the valve actuation parameters are changed when the engine speed NE drops, the drop in the engine speed NE is not sufficiently suppressed.

Therefore, in this embodiment, a control for suppressing a drop in the engine speed NE is executed to suppress a drop in the engine speed NE during idling.

Figure 5:
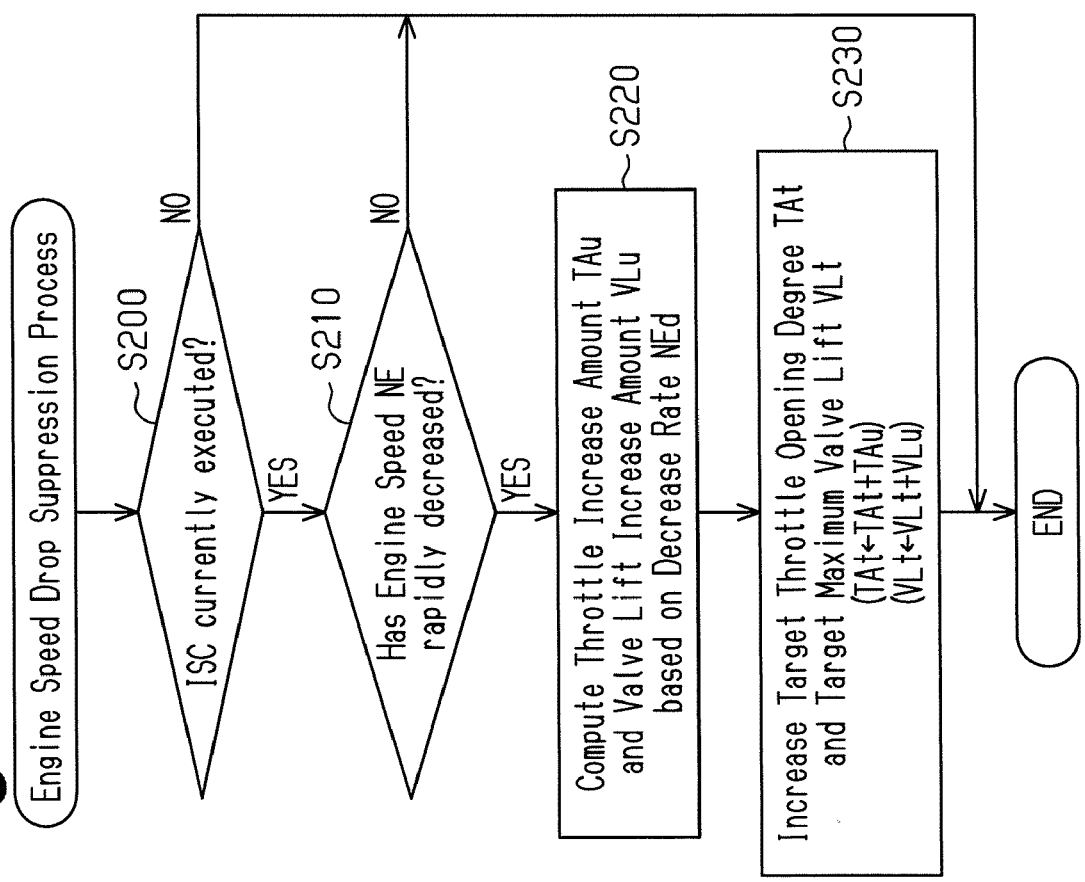
FIG. 5 is a flowchart showing a procedure of a control for suppressing a drop in an engine speed according to the first embodiment.

The flowchart of FIG. 5 shows a procedure of the engine speed drop suppression control.

The series of processes shown in the flowchart is executed by the electronic control unit 9, which functions as a changing section, at predetermined intervals.

In this procedure, whether the ISC is currently executed is first determined (S200) as shown in FIG. 5. If the ISC is not determined to be currently executed (negative outcome at S200), the current process is temporarily suspended.

On the other hand, if the ISC is determined to be currently executed (positive outcome at S200), whether the engine speed NE has rapidly decreased, that is, whether there has been a drop in the engine speed NE, is determined (S210). Specifically, the rate of decrease NEd of the engine speed NE is computed based on the amount of decrease in the engine speed NE for a predetermined period, and if the decrease rate NEd surpasses a predetermined threshold value α, it is determined that there has been a drop in the engine speed NE. If at step S210 it is determined that there has been no drop in the engine speed NE (negative outcome at S210), the current process is temporarily suspended.

On the other hand, if it is determined that there has been a drop in the engine speed NE (positive outcome at S210), a throttle increase amount TAu and a valve lift increase amount VLu are computed based on the decrease rate NEd (S220). The throttle increase amount TAu is a value for increasing the throttle opening degree TA of the throttle valve 38, and the valve lift increase amount VLu is a value for increasing the maximum valve lift VL of the intake valve 35. Since the amount of increase in the intake air amount for suppressing a rapid decrease in the engine speed NE varies in accordance with the decrease rate NEd, the throttle increase amount TAu and the valve lift increase amount VLu are computed to be greater values based on the decrease rate NEd as the decrease rate NEd is increased.

Next, the current target throttle opening degree TAt, which has been computed in the ISC, is corrected based on the following equation (2), and the current target maximum valve lift VLt is corrected based on the following equation (3) (S230). The target maximum valve lift VLt during idling of the engine 1 has an appropriate value that has been determined in advance.

Target Throttle Opening Degree TAt=Current Target
Throttle Opening Degree TAt+Throttle Increase
Amount TAu    (2)

Target Maximum Valve Lift VLt=Current Target
Maximum Valve Lift VLt+Valve Lift Increase
Amount VLu    (3)

In this manner, the target throttle opening degree TAt is corrected in accordance with the decrease rate NEd, and the opening degree of the throttle valve 38 is increased. Also, since the target maximum valve lift VLt is corrected in accordance with the decrease rate NEd, the maximum valve lift VL is increased. The current process is then temporarily suspended.

Figure 6:
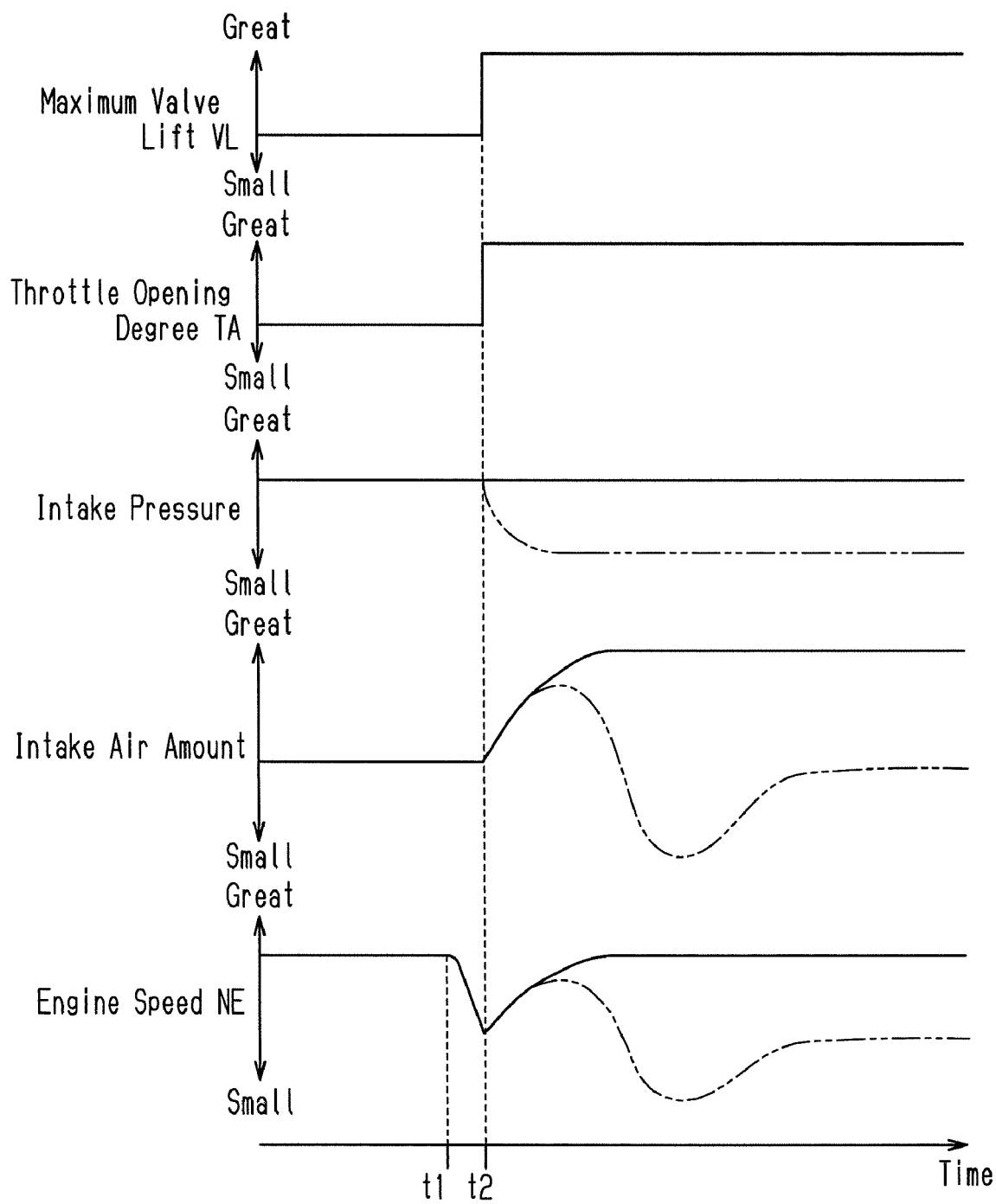
FIG. 6 is a timing chart showing an example of the suppression of a drop in the engine speed during the execution of the drop suppression control.

FIG. 6 shows an example of the suppression of a drop in the engine speed NE during the execution of the drop suppression control. In FIG. 6, the engine speed NE prior to time t1 is controlled to be the target engine speed NEt in the above described ISC.

As shown in FIG. 6, the engine speed NE, which has been controlled to be the target engine speed NEt for idling, starts decreasing rapidly at time t1. When the decrease rate NEd surpasses a threshold value α (time t2), it is determined that there has been a drop in the engine speed NE.

When increasing only the maximum valve lift VL of the intake valve 35, the intake air amount is temporarily increased as shown by alternate long and two short dashes line in FIG. 6. However, in the intake passage, the intake pressure in the section downstream of the throttle valve 38 rapidly decreases. Thus, after time t2, the engine speed NE, which has been increased, will drop again.

In this embodiment, the drop suppression process is executed so that the maximum valve lift VL and the throttle opening degree TA are increased. Therefore, even if the air in a section of the intake passage from the throttle valve 38 to the intake valve 35 rapidly flows toward the combustion chamber 23 due to the change of the maximum valve lift VL, the amount of the air that flows is quickly compensated from a section upstream of the throttle valve 38. This suppresses the decrease in the intake pressure in a section of the intake passage downstream of the throttle valve 38. Thus, after the maximum valve lift VL is changed, the pressure difference between the intake passage and the combustion chamber 23 is maintained, and the increase in the intake air amount is continued after time t2. Therefore, to deal with the drop in the engine speed NE during idling of the engine 1, the intake air amount is quickly increased. Accordingly, drop in the engine speed NE during idling is suppressed.

The embodiment described above provides the following advantages.

(1) When the engine speed NE rapidly decreases during idling, the maximum valve lift VL and the throttle opening degree TA changed to increase the intake air amount. Therefore, to deal with a drop in the engine speed NE during idling of the engine 1, the intake air amount is quickly and continuously increased. Accordingly, drop in the engine speed NE during idling is reliably suppressed.

(2) The change amounts of the maximum valve lift VL and the throttle opening degree TA are varied in accordance with the decrease rate NEd of the engine speed NE. Specifically, the greater the decrease rate NEd, the greater the maximum valve lift VL and the throttle opening degree TA are set. Thus, a drop in the engine speed NE is appropriately suppressed in accordance with the state of decrease in the engine speed NE.

Next an idle speed control apparatus for an internal combustion engine according to a second embodiment of the present invention will now be described with reference to FIGS. 7 and 8.

In the first embodiment, the maximum valve lift VL and the throttle opening degree TA are increased when there is a drop in the engine speed NE. However, when changing the maximum valve lift VL of the intake valve 35 to increase the intake air amount, a period during which the intake valve 35 and the exhaust valve 36 are both open, that is, valve overlap, can be increased. Particularly, the above described variable valve duration mechanism 53 is configured to increase the valve opening period IVOT of the intake valve 35 in synchronization with an increase in the maximum valve lift VL. Thus, when the maximum valve lift VL is increased, the valve overlap is inevitably increased. If the valve overlap increases, the internal EGR increases, accordingly. This reduces the amount of fresh air drawn into the combustion chamber 23. Thus, even if the maximum valve lift VL of the intake valve 35 is changed to increase the intake air amount, the intake air amount is not increased by a desired amount.

Figure 7:
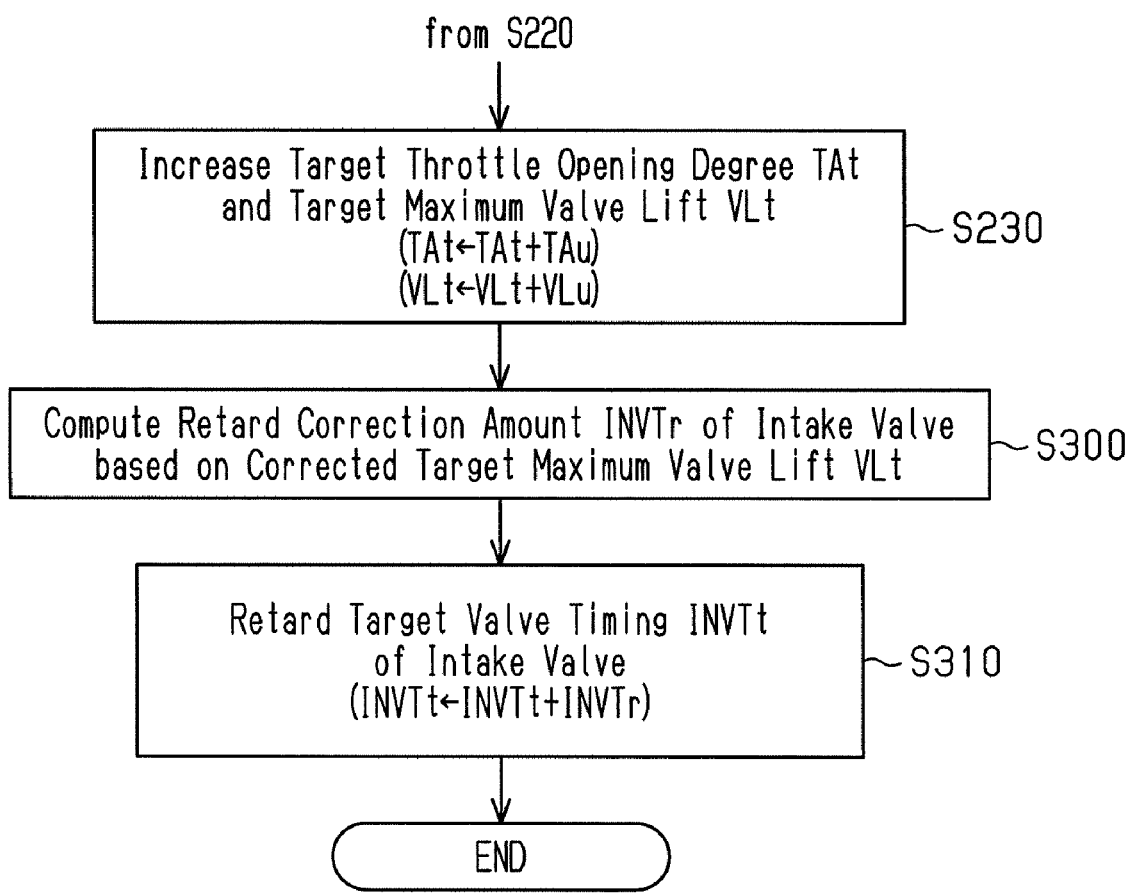
FIG. 7 is a flowchart showing a part of a procedure of a control for suppressing a drop in an engine speed according to a second embodiment.

Accordingly, in this embodiment, processes of step S300 and step S310 shown in FIG. 7 are added to the drop suppression process described in the first embodiment. When changing the maximum valve lift VL and the throttle opening degree TA, the valve timing INVT of the intake valve 35 is retarded.

In this embodiment, as shown in FIG. 7, steps S300 and S310 are executed subsequent to step S230 shown in FIG. 5.

At step S300, a retard correction amount INVTr of the intake valve 35 is varied in accordance with an increase in the valve overlap due to a change of the maximum valve lift VL. Specifically, the retard correction amount INVTr is computed based on the target maximum valve lift VLt corrected at step S230. To suppress an increase in the valve overlap due to an increase in the target maximum valve lift VLt, the retard correction amount INVTr is computed to have a greater value as the target maximum valve lift VLt increases. Such a configuration allows the amount of retard of the valve timing INVT to be appropriately set.

When retarding the valve timing INVT to suppress an increase in the valve overlap, the retard correction amount INVTr needs to be computed such that the valve overlap in the case where the valve timing INVT is retarded is less than the valve overlap in the case where the actual maximum valve lift VL of the intake valve 35 is made equal to the target maximum valve lift VLt corrected at step S230. Therefore, the retard correction amount INVTr may be computed to be a value with which the valve overlap will be the same as or less than that prior to the increase in the maximum valve lift VL.

Subsequently, at step S310, the target valve timing INVTt is retarded based on the following equation (4).

Target Valve Timing INVTt=Current Target Valve
Timing INVTt+Retard Correction Amount
INVTr    (4)

When the target valve timing INVTt is retarded in accordance with the target maximum valve lift VLt, the variable valve timing mechanism 51 is controlled such that the actual valve timing INVT becomes equal to the target valve timing INVTt. The current process is then temporarily suspended.

Figure 8:
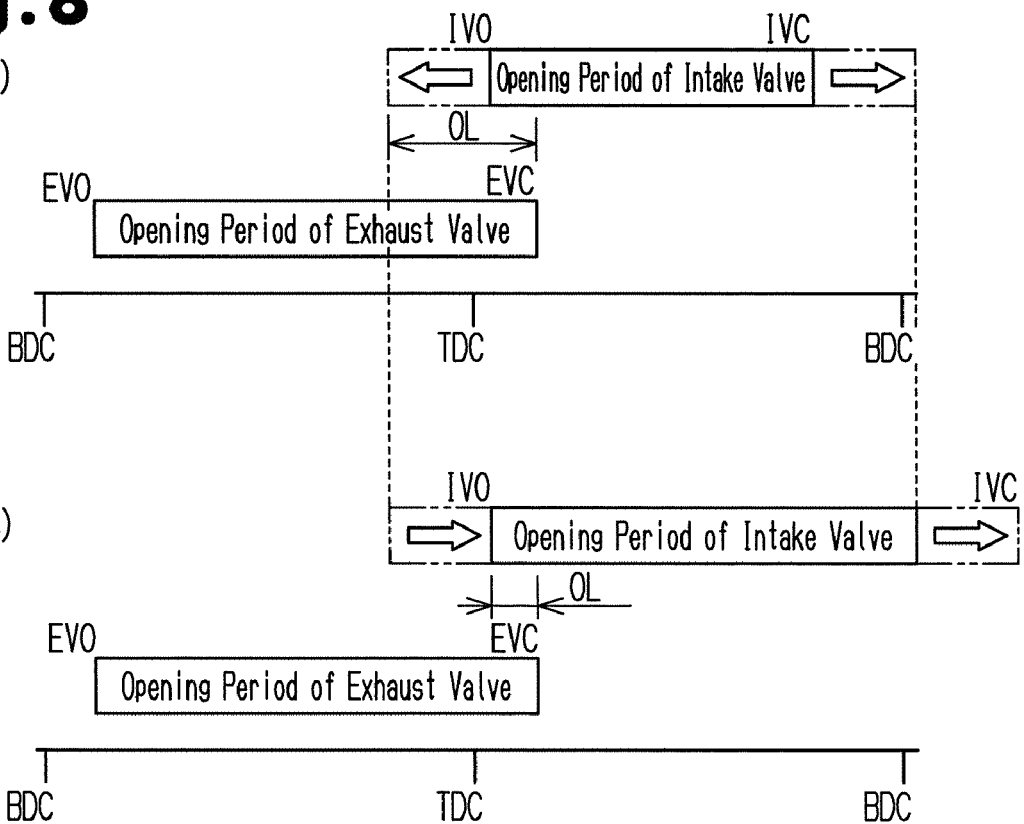
FIG. 8 is a diagram showing changes in the valve timing of an intake valve, in which section (A) is a graph showing a case where the drop suppression control of this embodiment is not performed, and section (B) is a graph showing a case where the drop suppression control of the this embodiment is performed.

Sections (A) and (B) of FIG. 8 show changes in the valve timing of the intake valve 35 when the drop suppression process of this embodiment is executed.

As shown in section (A) of FIG. 8, in the variable valve duration mechanism 53, when the target maximum valve lift VLt is increased, the opening period of the intake valve 35 is increased. Therefore, if no measure is taken, the intake air amount cannot be increased by a desired amount due to the increase in the valve overlap OL.

On the other hand, if the drop suppression process of this embodiment is executed, the target valve timing INVTt of the intake valve 35 is retarded when the target maximum valve lift VLt is increased as shown in section (B) of FIG. 8. Accordingly, the opening timing of the intake valve 35 is retarded so that the increase in the valve overlap OL is suppressed. Thus, when the target maximum valve lift VLt is increased, the intake air amount is reliably increased.

The embodiment described above provides the following advantages.

(1) When changing the maximum valve lift VL and the throttle opening degree TA, the valve timing INVT of the intake valve 35 is retarded. Therefore, when changing the maximum valve lift VL to increase the intake air amount, the opening timing of the intake valve 35 is retarded. This suppresses increase in the valve overlap as described above. Thus, when the maximum valve lift VL and the throttle opening degree TA are changed, the intake air amount is reliably increased.

(2) The amount of retard of the valve timing INVT is varied in accordance with an increase in the valve overlap due to a change of the maximum valve lift VL. Specifically, the amount of retard of the valve timing INVT is increased as the amount of increase in the valve overlap due to a change of the maximum valve lift VL increases. Therefore, the amount of retard of the valve timing INVT is appropriately determined.

The above embodiments may be modified as follows.

In the above illustrated embodiments, the target maximum valve lift VLt is increased. Other than this, when controlling the variable valve duration mechanism 53 based on the valve duration INCAM, a target value of the valve duration INCAM may be increased in the same manner as described in each embodiment.

In the drop suppression process, the change amounts of the maximum valve lift VL and the throttle opening degree TA are varied in accordance with the decrease rate NEd of the engine speed NE. Other than this, when the engine speed NE rapidly decreases during idling, the maximum valve lift VL and the throttle opening degree TA may be changed in any manner as long as the maximum valve lift VL and the throttle opening degree TA are changed to increase the intake air amount. For example, when it is determined that there has been a drop in the engine speed, each of the maximum valve lift VL and the throttle opening degree TA may be increased by a predetermined fixed value.

In the drop suppression process, whether there has been a drop in the engine speed is determined based on the decrease rate NEd of the engine speed NE, and the change amounts of the maximum valve lift VL and the throttle opening degree TA are varied in accordance with the decrease rate NEd of the engine speed NE.

Other than this, since the deviation ΔNE between the actual engine speed NE and the target engine speed NEt is increased when the engine speed rapidly decreases, a rapid decrease in the engine speed NE may be determined based on the deviation ΔNE. In this case, the amount of increase in the intake air amount for suppressing the rapid decrease in the engine speed NE is changed in accordance with the deviation ΔNE. Then, when the deviation ΔNE between the engine speed NE and the target engine speed NEt surpasses a predetermined threshold value β, it is determined that there has been a rapid decrease in the engine speed. The change amounts of the maximum valve lift VL and the throttle opening degree TA may be varied in accordance with the deviation ΔNE. In this case, also, a drop in the engine speed NE is suppressed in accordance with the state of decrease in the engine speed NE. In this configuration, the maximum valve lift VL and the throttle opening degree TA are preferably increased as the deviation ΔNE increases.

In the above illustrated embodiments, the valve actuation parameters of the intake valve 35 that are changed when the engine speed drops are the valve lift and the opening period. Other than this, if only one of the valve lift and the opening period of the intake valve 35 is changed, the same advantages are obtained. Therefore, if the variable valve duration mechanism 53 is a valve opening period adjustment mechanism that changes only the opening period IVOT of the intake valve 35, or as a valve lift adjustment mechanism that changed only the maximum valve lift VL of the intake valve 35, the present invention is applied in the same manner as described above.

Figure 9:
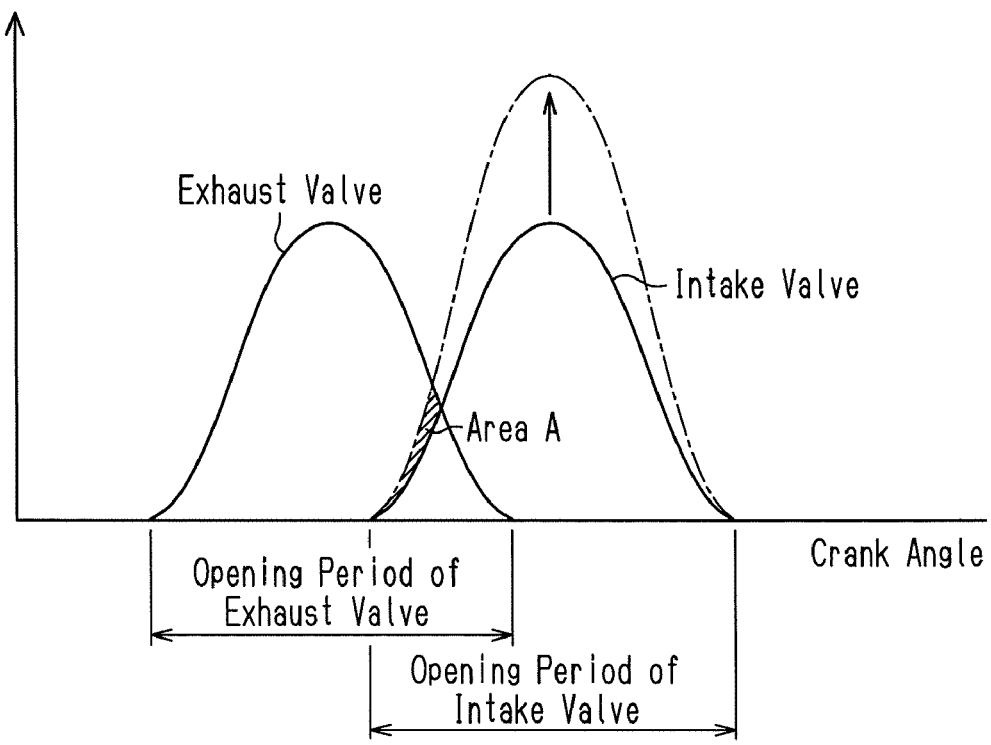
FIG. 9 is a graph for explaining an increase in the valve overlap accompanying an increase in a valve lift.

If the variable valve duration mechanism 53 is a valve lift adjustment mechanism that changes only the maximum valve lift VL, the opening period of the intake valve 35 stays unchanged even if the valve lift is changed. However, if the valve lift is increased, the valve overlap is substantially increased by the amount corresponding to shaded area A in FIG. 9. Thus, even in the case where the variable valve duration mechanism 53 is such a valve lift adjustment mechanism, the same advantages of the second embodiment are obtained by executing the drop suppression process of the second embodiment.

In the above illustrated embodiments, the intake air amount control valve located upstream of the intake valve 35 is the throttle valve 38. Other than this, as illustrated by broken lines in FIG. 1, a bypass pipe 80 that bypasses the throttle valve 38 may be provided in the intake passage, and an idle speed control valve 81 that adjusts the intake air amount during idling may be provided in the bypass pipe 80. In the case where the opening degree of the idle speed control valve 81 is controlled by the electronic control unit 9, the idle speed control valve 81 may function as an intake air amount control valve. In this case, also, by changing the opening degree of the idle speed control valve 81 to increase the intake air amount when the engine speed rapidly decreases, the same advantages as the above illustrated embodiments are obtained.

The invention claimed is:

1. An apparatus for controlling a speed of an internal combustion engine during idling to be a target engine speed, the engine including a valve actuation parameter adjustment mechanism capable of changing an intake valve actuation parameter that is a valve opening period and a valve lift of an intake valve, and an intake air amount control valve located in a section upstream of the intake valve, the apparatus comprising:

a changing section that, when the engine speed during idling rapidly decreases, changes the intake valve actuation parameter and a control valve opening degree, which is an opening degree of the intake air amount control valve, such that an intake air amount is increased.

2. The apparatus according to claim 1, wherein the changing section changes the amounts of changes in the intake valve actuation parameter and the control valve opening degree in accordance with a rate of decrease in the engine speed.

3. The apparatus according to claim 2, wherein the changing section increases the amounts of changes in the intake valve actuation parameter and the control valve opening degree as the decrease rate of the engine speed increases.

4. The apparatus according to claim 1, wherein the changing section changes the amounts of changes in the intake valve actuation parameter and the control valve opening degree in accordance with a deviation between an actual engine speed and the target engine speed.

5. The apparatus according to claim 4, wherein the changing section increases the amounts of changes in the intake valve actuation parameter and the control valve opening degree as the deviation increases.

6. The apparatus according to claim 1, wherein, when the engine speed during idling rapidly decreases, the changing section increases the intake valve actuation parameter and the control valve opening degree by predetermined fixed values.

7. The apparatus according to claim 1, wherein the engine further includes a variable valve timing mechanism capable of changing valve timing of the intake valve, and wherein the changing section retards the valve timing when changing the intake valve actuation parameter and the control valve opening degree.

8. The apparatus according to claim 7, wherein the changing section retards the valve timing, thereby suppressing an increase in the valve overlap due to a change in the intake valve actuation parameter.

9. The apparatus according to claim 8, wherein the changing section changes the amount of retard of the valve timing in accordance with the amount of increase in the valve overlap due to the change in the intake valve actuation parameter.

10. The apparatus according to claim 9, wherein the changing section increases the amount of retard as the amount of increase in the valve overlap due to the change in the intake valve actuation parameter increases.

11. The apparatus according to claim 1, wherein the intake air amount control valve is a throttle valve located in an intake passage of the engine.

12. The apparatus according to claim 1, wherein the engine includes an intake passage, a throttle valve located in the intake passage, a bypass pipe connected to the intake passage to bypass the throttle valve, and an idle speed control valve located in the bypass pipe, wherein the intake air amount control valve is the idle speed control valve.

* * * * *